United States Patent
Liao et al.

(10) Patent No.: US 12,537,375 B2
(45) Date of Patent: Jan. 27, 2026

(54) METHOD AND APPARATUS FOR SIMULATING BREAKDOWN OF ELECTRONIC COMPONENT

(71) Applicant: Realtek Semiconductor Corp., HsinChu (TW)

(72) Inventors: Shih-Hsin Liao, HsinChu (TW); Rui-Hong Liu, HsinChu (TW); Tay-Her Tsaur, HsinChu (TW); Po-Ching Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 236 days.

(21) Appl. No.: 18/234,884

(22) Filed: Aug. 17, 2023

(65) Prior Publication Data

US 2024/0063634 A1 Feb. 22, 2024

(30) Foreign Application Priority Data

Aug. 19, 2022 (TW) .................................. 111131278

(51) Int. Cl.
*H02H 9/04* (2006.01)
*G06F 30/367* (2020.01)

(52) U.S. Cl.
CPC ........... *H02H 9/046* (2013.01); *G06F 30/367* (2020.01)

(58) Field of Classification Search
CPC ....... H02H 9/046; H02H 9/041; G06F 30/367
USPC .......................................................... 361/56
See application file for complete search history.

(56) References Cited

U.S. PATENT DOCUMENTS

| | | | | |
|---|---|---|---|---|
| 5,946,177 A | * | 8/1999 | Miller | H10D 89/60 361/56 |
| 6,072,682 A | * | 6/2000 | Ravanelli | H10D 89/811 361/111 |
| 6,118,641 A | * | 9/2000 | Atkins | H02H 3/087 361/58 |
| 7,102,862 B1 | * | 9/2006 | Lien | H10D 89/819 361/56 |
| 8,072,722 B1 | * | 12/2011 | Hwang | H02H 9/046 361/56 |
| 8,514,532 B2 | * | 8/2013 | Worley | H02H 9/046 361/111 |

(Continued)

FOREIGN PATENT DOCUMENTS

CN 105653823 A 6/2016
CN 114896934 A 8/2022

*Primary Examiner* — Dharti H Patel
(74) *Attorney, Agent, or Firm* — Winston Hsu

(57) ABSTRACT

A method and apparatus for simulating breakdown of an electronic component are provided. The method includes: when a terminal of an equivalent circuit model receives test charges, pulling up a voltage level of a first node of the equivalent circuit model; when the voltage level of the first node reaches a first threshold, turning on a first voltage controlled switch to pull up a voltage level of a second node of the equivalent circuit model; when the voltage level of the second mode reaches a second threshold, turning on a second voltage controlled switch to pull down a voltage level of the terminal to a holding voltage level to simulate snapback breakdown of the electronic component; and turning on a third voltage controlled switch to pull down the voltage level of the second node to turn off the second voltage controlled switch, thereby simulating second breakdown of the electronic component.

16 Claims, 5 Drawing Sheets

(56) References Cited

U.S. PATENT DOCUMENTS

| | | | |
|---|---|---|---|
| 10,177,135 B2* | 1/2019 | Huang | H10D 89/811 |
| 11,088,542 B1* | 8/2021 | Langguth | H10D 89/911 |
| 11,916,376 B2* | 2/2024 | Chen | H10D 89/819 |
| 12,132,308 B2* | 10/2024 | Xue | H02H 9/046 |
| 2007/0076338 A1* | 4/2007 | Traynor | H10D 89/819 |
| | | | 361/56 |
| 2007/0285854 A1* | 12/2007 | Rodgers | H02H 9/046 |
| | | | 361/56 |
| 2009/0128970 A1* | 5/2009 | Deval | H10D 89/811 |
| | | | 327/551 |
| 2013/0182359 A1* | 7/2013 | Jeon | H02H 9/044 |
| | | | 361/56 |
| 2013/0222954 A1* | 8/2013 | Demange | H10D 89/819 |
| | | | 361/56 |
| 2013/0258533 A1* | 10/2013 | Chen | H02H 9/046 |
| | | | 361/56 |
| 2013/0265676 A1* | 10/2013 | Prabhu | H02H 9/046 |
| | | | 361/56 |
| 2013/0335870 A1* | 12/2013 | Kushibe | H02H 9/046 |
| | | | 361/56 |
| 2016/0070836 A1 | 3/2016 | Kimura | |
| 2018/0026440 A1* | 1/2018 | Zhao | H10D 89/819 |
| | | | 361/56 |

* cited by examiner

METHOD AND APPARATUS FOR SIMULATING BREAKDOWN OF ELECTRONIC COMPONENT

BACKGROUND OF THE INVENTION

1. Field of the Invention

The present invention is related to electrostatic discharge (ESD) tests, and more particularly, to a method and an apparatus for simulating breakdown of an electronic component.

2. Description of the Prior Art

As semiconductor processes continue to develop, the size of the electronic components therein decreases, increasing the importance of electrostatic discharge (ESD) protection. During a circuit design phase, manufacturers expect to simulate circuits within products for ensuring that the products have sufficient endurance against ESD, and to assess the risk of damage to the circuits due to ESD events.

Under a condition where an ESD event occurs, charge/discharge behaviors within a circuit typically involve respective parasitic paths. Operations of these parasitic paths are hard to be simulated using component models provided by a foundry. Thus, there is a need for a novel method and an associated apparatus, in order to evaluate the risk of ESD during a circuit simulation phase.

SUMMARY OF THE INVENTION

An objective of the present invention is to provide a method and an apparatus for simulating breakdown of an electronic component (e.g. a transistor), to allow a manufacturer to test and simulate electrostatic discharge (ESD) and/or electrical over stress (EOS) events during a circuit simulation phase.

At least one embodiment of the present invention provides a method for simulating breakdown of an electronic component. The method comprises: utilizing a first terminal of an equivalent circuit model of the electronic component to receive test charges, in order to increase a voltage level of a first node of the equivalent circuit model; in response to the voltage level of the first node reaching a first threshold, turning on a first voltage controlled switch of the equivalent circuit model to increase a voltage level of a second node of the equivalent circuit model; and in response to the voltage level of the second node reaching a second threshold, turning on a second voltage controlled switch of the equivalent circuit model to decrease a voltage level of the first terminal to a holding voltage level, in order to simulate a snapback breakdown of the electronic component. In addition, when the voltage level of the first terminal proceeds to be pulled up from the holding voltage level to make a voltage level of a third node of the equivalent circuit model be pulled up, the method further comprises: in response to the voltage level of the third node reaching a third threshold, turning on a third voltage controlled switch of the equivalent circuit model to make the voltage level of the second node be lower than the second threshold, in order to turn off the second voltage controlled switch.

At least one embodiment of the present invention provides an apparatus for simulating breakdown of an electronic component. The apparatus comprises a storage device and a processing circuit, wherein the processing circuit is electrically coupled to the storage device. The storage device is configured to store a description file of an equivalent circuit model of the electronic component, and the processing circuit is configured to execute a simulation of the equivalent circuit model according to the description file, in order to obtain a response of the equivalent circuit model regarding test charges. In particular, the equivalent circuit model comprises a first terminal, a first voltage controlled switch electrically coupled to a first node, and a second voltage controlled switch electrically coupled to a second node. The first terminal is configured to receive the test charges to increase a voltage level of the first node of the equivalent circuit model. When the voltage level of the first node reaches a first threshold, the first voltage controlled switch is turned on to increase a voltage level of the second node of the equivalent circuit model. When the voltage level of the second node reaches a second threshold, the second voltage controlled switch is turned on to decrease a voltage level of the first terminal to a holding voltage level, in order to simulate a snapback breakdown of the electronic component.

The apparatus and the method provided by the embodiments of the present invention can utilize an equivalent circuit model formed by resistors, capacitors and switches to simulate the breakdown of the electronic component, in order to allow the manufacturer to test and simulate ESD and/or EOS events during the circuit simulation phase. In addition, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
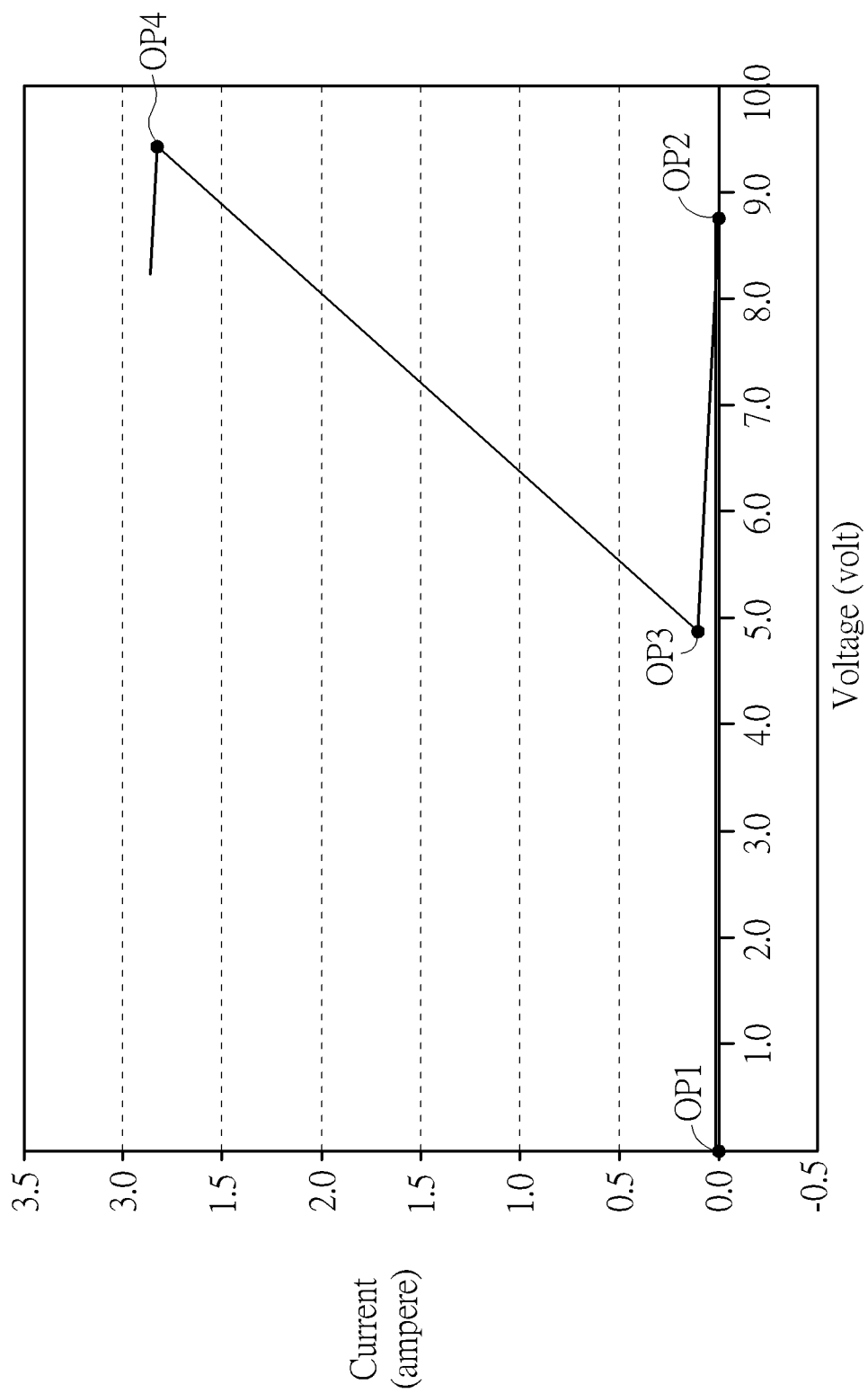
FIG. 1 is a diagram illustrating breakdown of an electronic component according to an embodiment of the present invention.

When a first terminal of an electronic component (e.g. a transistor) receives a great amount of charge due to electrostatic discharge (ESD), the electronic component may have a breakdown behavior. Assume that a second terminal of the electronic component is electrically coupled to a reference voltage such as a ground voltage. The breakdown behavior of the electronic component is shown in FIG. 1, where a horizontal axis of FIG. 1 represents a voltage level of the first terminal of the electronic component, and a vertical axis of FIG. 1 represents a current flowing from the first terminal of the electronic component to the second terminal of the electronic component. It should be noted that values shown in FIG. 1 are for illustrative purposes only, and are not meant to be a limitation of the present invention.

During a chip manufacturing process, the electronic component needs to be tested regarding ESD and electrical over stress (EOS) events under various models, such as a human-body model (HBM), a machine model (MM), a charge-device model (CDM), a field-induced model (FIM) and an ESD gun. When the electronic component receives the great amount of charge due to an ESD or EOS event, the voltage level of the first terminal of the electronic component may be rapidly pulled up (e.g. from an operation point OP1 to an operation point OP2). When the voltage level of the first terminal of the electronic component is pulled up to a certain threshold (e.g. a voltage level corresponding to the operation point OP2), the voltage level of the first terminal of the electronic component may drop to a holding voltage level due to a snapback breakdown, as illustrated by an operation point OP3. Then, the voltage level of the first terminal of the electronic component may proceed to be pulled up from the holding voltage. The current flowing from the first terminal of the electronic component to the second terminal of the electronic component increases as a result, such that a second breakdown may occur at an operation point OP4.

The present invention utilizes components having simple electrical characteristics such as resistors, capacitors and switches (e.g. voltage controlled switches) to build an equivalent circuit model for simulating the breakdown of the electronic component shown in FIG. 1. For example, under control of the voltage controlled switches, the equivalent circuit model can have a behavior conforming to the change of voltage/current shown in FIG. 1 when the ESD event occurs, making a manufacturer be able to perform related electrical protection tests and simulation during a circuit simulation phase.

Figure 2:
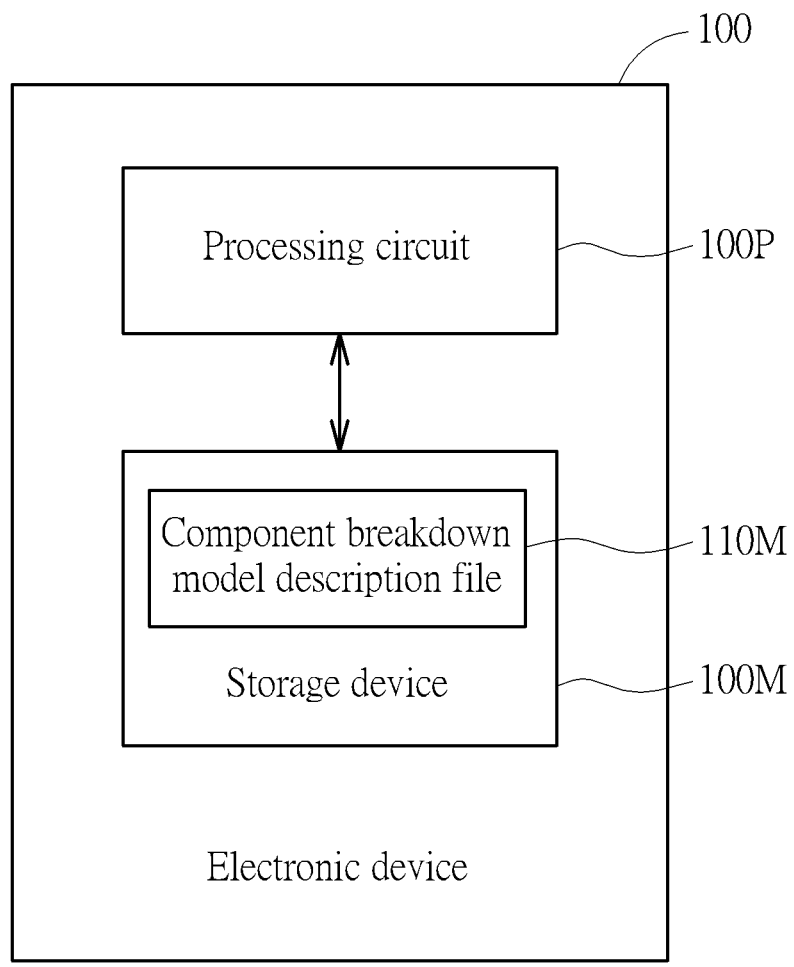
FIG. 2 is a diagram illustrating an apparatus for simulating breakdown of an electronic component according to an embodiment of the present invention.

FIG. 2 is a diagram illustrating an apparatus such as an electronic device (e.g. a circuit simulator) for simulating breakdown (e.g. the breakdown behavior shown in FIG. 1) of an electronic component according to an embodiment of the present invention. As shown in FIG. 2, the electronic device 100 may comprise a storage device 100M and a processing circuit 100P, where the processing circuit 100P is electrically coupled to the storage device 100M. In this embodiment, the storage device 100M may be configured to store a description file such as a component breakdown model description file 110M of an equivalent circuit model of the electronic component, and the processing circuit 100P may be configured to perform simulation of the equivalent circuit model according to the component breakdown model description file 110M, in order to obtain a response of the equivalent circuit model regarding test charges.

Figure 3:
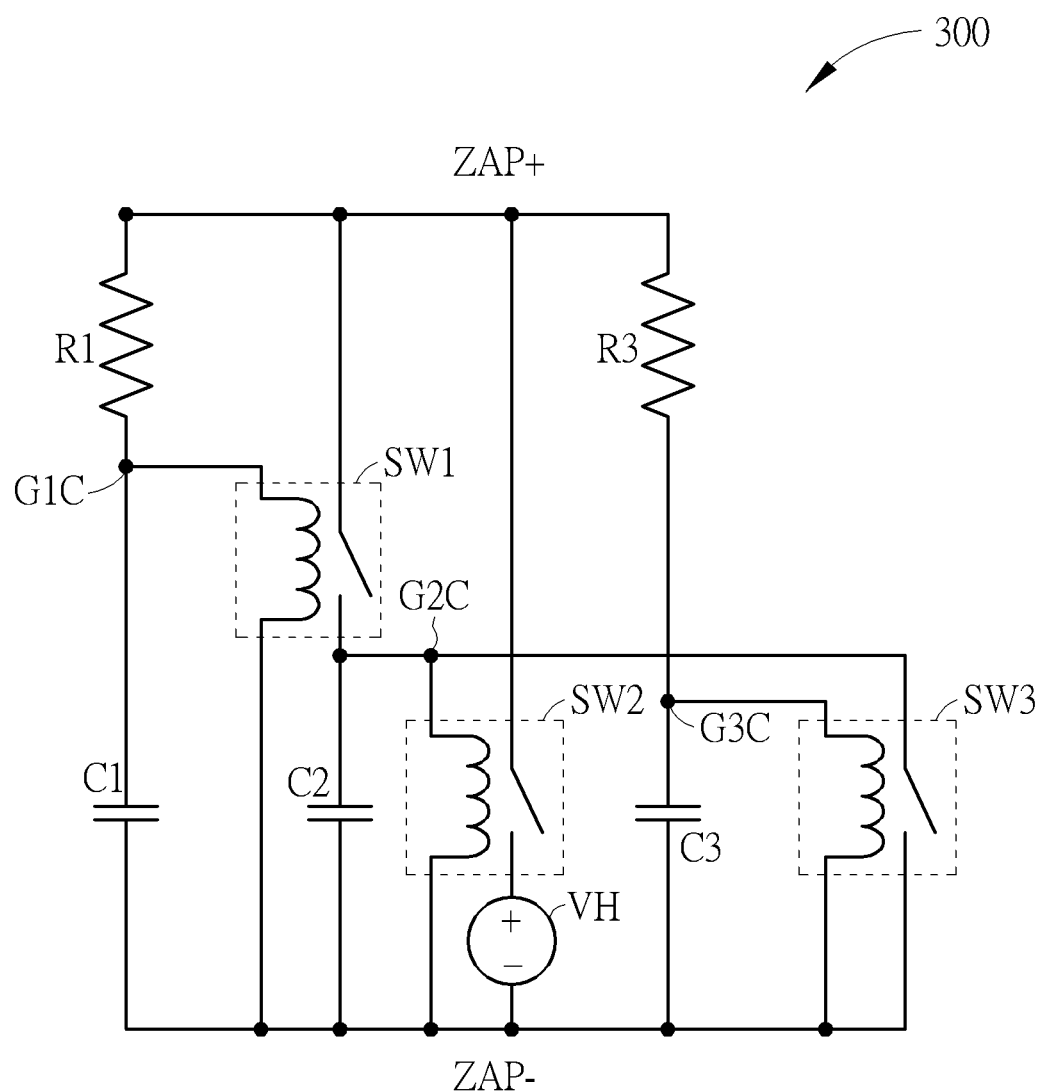
FIG. 3 is a diagram illustrating an equivalent circuit model for simulating breakdown of an electronic component according to an embodiment of the present invention.

FIG. 3 is a diagram illustrating an equivalent circuit model 300 for simulating breakdown of the electronic component according to an embodiment of the present invention, where the equivalent circuit model 300 may be an example of the equivalent circuit model described by the component breakdown model description file 110M. As shown in FIG. 3, the equivalent circuit model 300 may comprise a first terminal ZAP+, a second terminal ZAP−, voltage controlled switches SW1, SW2 and SW3, resistors R1 and R3, capacitors C1, C2 and C3, and a holding voltage source VH. In this embodiment, the second terminal ZAP− may be electrically coupled to a reference voltage such as the ground voltage, and the first terminal ZAP+ may be configured to receive test charges, in order to increase (e.g. pull up) a voltage level of a node G1C of the equivalent circuit model 300, where the resistor R1 is electrically coupled between the first terminal ZAP+ and the node G1C, and the capacitor C1 is electrically coupled between the node G1C and the second terminal ZAP−. The test charges may represent an entirety of the great amount of charge received by the equivalent circuit model 300 due to the ESD, where the test charges may charge the capacitor C1 via the resistor R1, and the voltage level of the node G1C may be pulled up accordingly.

The voltage controlled switch SW1 is electrically coupled between the first terminal ZAP+ and a node G2C, and the capacitor C2 is electrically coupled between the node G2C and the second terminal ZAP−, where a voltage controlled terminal of the voltage controlled switch SW1 is electrically coupled to the node G1C, in order to control whether to make a path between the first terminal ZAP+ and the node G2C conductive according to the voltage level of the node G1C. More particularly, when the voltage level of the node G1C is lower than a first threshold, the voltage controlled switch SW1 is turned off; and when the voltage level of the node G1C reaches the first threshold, the voltage controlled switch SW1 is turned on, and the test charges may start charging the capacitor C2 to increase (e.g. pull up) a voltage level of the node G2C. In particular, the voltage controlled switch SW1 being turned on may correspond to an ESD event of the electronic component. For example, the voltage controlled switch being turned on may be regarded as detecting an occurrence of the ESD event. Thus, after the voltage controlled switch SW1 is turned on, this process of pulling up the voltage levels of the node G2C and the first terminal ZAP+ may be regarded as simulation of the process from the operation point OP1 to the operation point OP2 shown in FIG. 1.

The voltage controlled switch SW2 is electrically coupled between the first terminal ZAP+ and the holding voltage source VH, and the holding voltage source VH is electrically coupled between the voltage controlled switch SW2 and the second terminal ZAP−, where a voltage controlled terminal of the voltage controlled switch SW2 is electrically coupled to the node G2C, in order to control whether to make a path between the first terminal ZAP+ and the holding voltage source VH conductive according to the voltage level of the node G2C. More particularly, when the voltage level of the node G2C is lower than a second threshold, the voltage controlled switch SW2 is turned off; and when the voltage level of the node G2C reaches the second threshold, the voltage controlled switch SW2 is turned on, and the voltage level of the first terminal ZAP+ may be pulled down to a holding voltage level (i.e. a voltage level provided by the holding voltage source VH), in order to simulate a snapback breakdown of the electronic component. Thus, at the moment of turning on the voltage controlled switch SW2, the behavior of the voltage level of the first terminal ZAP+ being pulled down to the holding voltage level may be regarded as simulation of a process from the operation point OP2 to the operation point OP3 shown in FIG. 1.

The resistor R3 is electrically coupled between the first terminal ZAP+ and a node G3C, and the capacitor C3 is electrically coupled between the node G3C and the second terminal ZAP−. After the voltage level of the first terminal ZAP+ and the voltage level of the node G2C are pulled down to the holding voltage, the voltage level of the first terminal ZAP+ may proceed to be pulled up from the holding voltage in response to the test charges, making a voltage level of the third node G3C be pulled up. For example, the test charges may charge the capacitor via the resistor R3, and the voltage level of the node G3C and the voltage level of the first terminal ZAP+ may be accordingly pulled up, where this process of pulling up the voltage level of the first terminal ZAP+ may be regarded as simulation of the process from the operation point OP3 to the operation point OP4 shown in FIG. 1.

The voltage controlled switch SW3 is electrically coupled between the node G2C and the second terminal ZAP+, where a voltage controlled terminal of the voltage controlled switch SW3 is electrically coupled to the node G3C, in order to control whether to make a path between the node G2C and the second terminal ZAP− conductive according to the voltage level of the node G3C. More particularly, when the voltage level of the node G3C is lower than a third threshold, the voltage controlled switch SW3 is turned off; and when the voltage level of the node G3C reaches the third threshold, the voltage controlled switch SW3 may be turned on to decrease (e.g. pull down) the voltage level of the node G2C, thereby making the voltage level of the node G2C lower than the second threshold to turn off the voltage controlled switch SW2. Under this condition, the voltage controlled switches SW1 and SW3 which are turned on may form a discharging path (e.g. a low impedance path similar to a short circuit) between the first terminal ZAP+ and the second terminal ZAP− to make the voltage level of the first terminal ZAP+ be pulled down, and a big current flowing from the first terminal ZAP+ to the second terminal ZAP− may be generated by the discharging path, where such a phenomenon may be regarded as simulation of a second breakdown of the electronic component caused by the ESD event.

Figure 4:
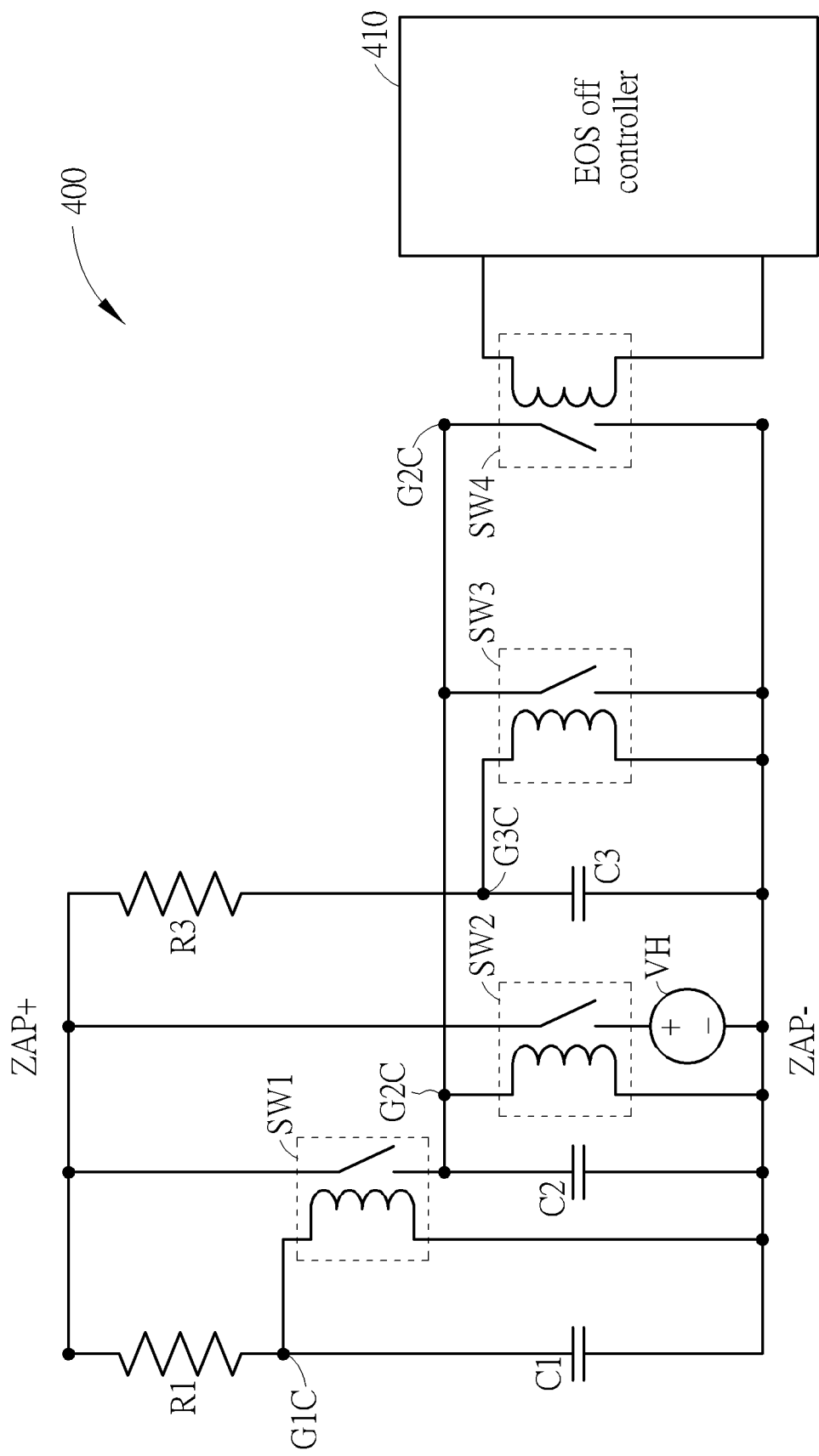
FIG. 4 is a diagram illustrating an equivalent circuit model for simulating breakdown of an electronic component according to another embodiment of the present invention.

It should be noted that the electronic component may have the second breakdown during a test of the EOS. Utilizing the equivalent circuit model 300 to perform the simulation of the EOS is unable to make the node G3C be pulled up to a sufficiently high level, however, and therefore the second breakdown event of the equivalent circuit model 300 cannot be properly tested and evaluated during the circuit simulation phase. Thus, the equivalent circuit model 300 can be further improved as shown in FIG. 4, which is a diagram illustrating an equivalent circuit model 400 for simulating breakdown of an electronic component according to another embodiment of the present invention. In comparison with the equivalent circuit model 300 shown in FIG. 3, the equivalent circuit model 400 may further comprise a voltage controlled switch SW4 and an EOS off controller 410. The remaining controlling component of the equivalent circuit model 400 may be known by referring to the embodiment of FIG. 3, details of which are not repeated here for brevity.

The voltage control switch SW4 is electrically coupled between the node G2C and the second terminal ZAP−, and the EOS off controller 410 is electrically coupled to a voltage controlled terminal of the voltage controlled switch SW4. In this embodiment, the EOS off controller 410 may comprise a timer to record a period of the first terminal ZAP+ receiving the test charges, where the first terminal ZAP+ may receive the test charges when the simulation starts, and the timer may start timing when the simulation starts in order to generate the period of the first terminal ZAP+ receiving the test charges (which may be regarded as a period in which the EOS event occurs). More particularly, when the period of the first terminal ZAP+ receiving the test charges does not reach a time threshold yet, the EOS off controller 410 may transmit a voltage level lower than a fourth threshold to the voltage controlled terminal of the voltage controlled switch SW4, in order to turn off the voltage controlled switch SW4. When the period of the first terminal ZAP+ receiving the test charges reaches the time threshold, the EOS off controller 410 may transmit a voltage level higher than the fourth threshold to the voltage controlled terminal of the voltage controlled switch SW4, in order to turn on the voltage controlled switch SW4 and decrease (e.g. pull down) the voltage level of the node G2C, making the voltage level of the node G2C less than the second threshold in order to turn off the voltage controlled switch SW2. Under this condition, the voltage controlled switches SW1 and SW4 which are turned on may form a discharging path (e.g. a low impedance path similar to a short circuit) between the first terminal ZAP+ and the second terminal ZAP−, making the voltage level of the first terminal ZAP+ be pulled down, and a big current flowing from the first terminal ZAP+ to the second terminal ZAP− may be generated by the discharging path, where such a phenomenon may be regarded as simulation of the second breakdown of the electronic component caused by the EOS event.

Figure 5:
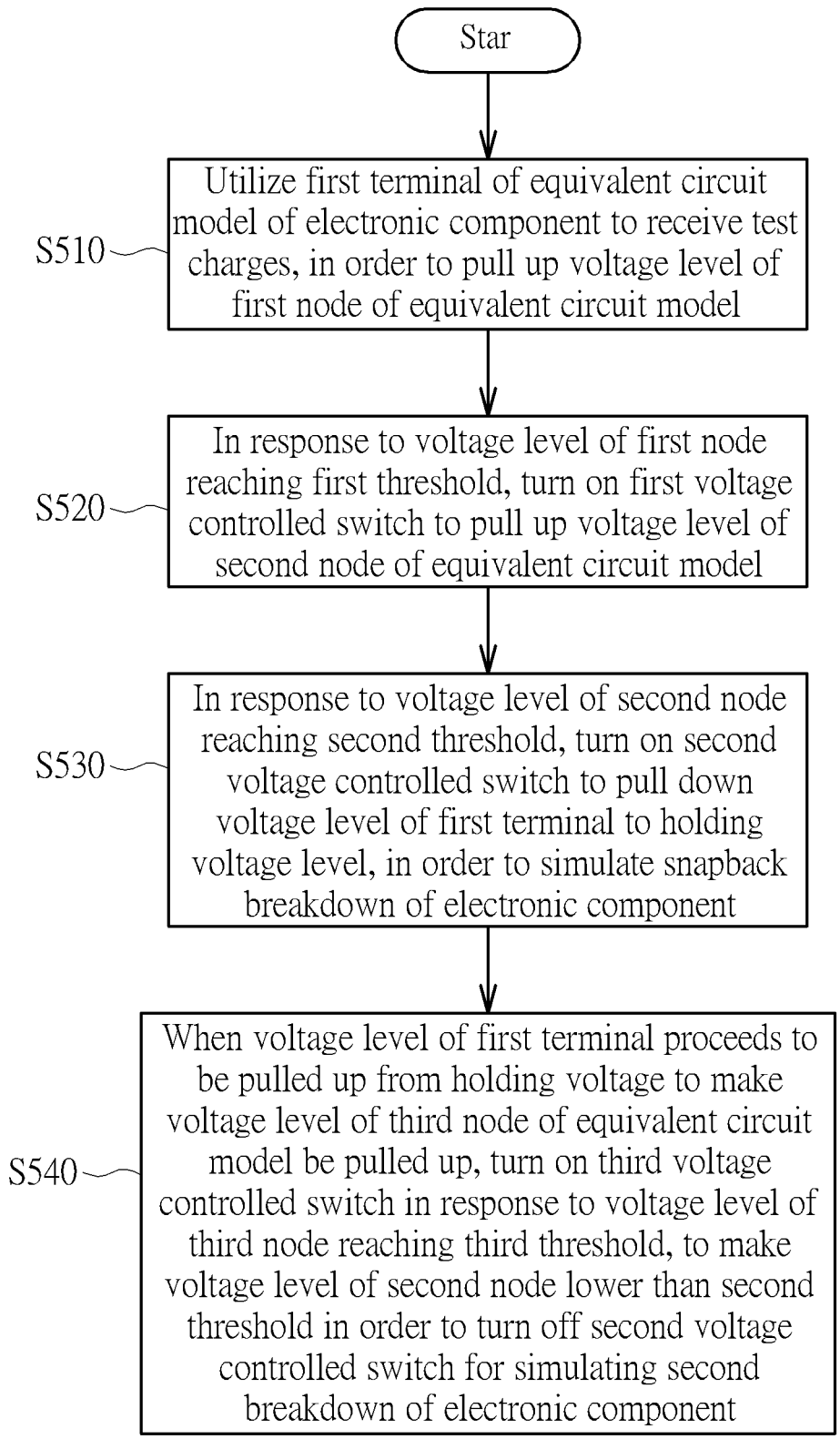
FIG. 5 is a diagram illustrating a working flow of a method for simulating breakdown of an electronic component according to an embodiment of the present invention.

FIG. 5 is a diagram illustrating a working flow of a method for simulating breakdown of an electronic component according to an embodiment of the present invention, where the method may be executed by the electronic device 100 shown in FIG. 2, and is applicable to the equivalent circuit model 300 shown in FIG. 3 or the equivalent circuit model 400 shown in FIG. 4. It should be noted that the working flow shown in FIG. 5 is for illustrative purposes only, and is not meant to be a limitation of the present invention. More particularly, one or more steps may be added, deleted or modified in the working flow shown in FIG. 5.

In Step S510, the electronic device 100 may utilize a first terminal of an equivalent circuit model (e.g. the equivalent circuit model 300 shown in FIG. 3 or the equivalent circuit model 400 shown in FIG. 4) of the electronic component to receive test charges, in order to increase (e.g. pull up) a voltage level of a first node of the equivalent circuit model.

In Step S520, in response to the voltage level of the first node reaching a first threshold, the electronic device 100 may turn on a first voltage controlled switch of the equivalent circuit model to increase (e.g. pull up) a voltage level of a second node of the equivalent circuit model.

In Step S530, in response to the voltage level of the second node reaching a second threshold, the electronic device 100 may turn on a second voltage controlled switch of the equivalent circuit model to decrease (e.g. pull down) a voltage level of the first terminal to a holding voltage level, in order to simulate a snapback breakdown of the electronic component.

In Step S540, when the voltage level of the first terminal proceeds to be pulled up from the holding voltage to make a voltage level of a third node of the equivalent circuit model be pulled up, the electronic device 100 may turn on a third voltage controlled switch of the equivalent circuit model in response to the voltage level of the third node reaching a third threshold, to make the voltage level of the second node lower than the second threshold in order to turn off the second voltage controlled switch for simulating a second breakdown of the electronic component.

To summarize, the apparatus and the method provided by the embodiment of the present invention can utilize an equivalent circuit model formed by resistors, capacitors and switches for simulating breakdown of an electronic component, allowing a manufacturer to test and simulate ESD and/or EOS events during a circuit simulation phase, in order to perform a primary evaluation on endurance of an overall system against the ESD and/or EOS events before manufacturing physical chips. In addition, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for simulating breakdown of an electronic component, comprising:
   utilizing a first terminal of an equivalent circuit model of the electronic component to receive test charges, in order to increase a voltage level of a first node of the equivalent circuit model;
   in response to the voltage level of the first node reaching a first threshold, turning on a first voltage controlled switch of the equivalent circuit model to increase a voltage level of a second node of the equivalent circuit model; and
   in response to the voltage level of the second node reaching a second threshold, turning on a second voltage controlled switch of the equivalent circuit model to decrease a voltage level of the first terminal to a holding voltage level, in order to simulate a snapback breakdown of the electronic component;
   wherein the equivalent circuit model comprises a holding voltage source electrically coupled between the second voltage controlled switch and a second terminal of the equivalent circuit model, and the second voltage controlled switch is electrically coupled between the first terminal and the holding voltage source.

2. The method of claim 1, wherein turning on the first voltage controlled switch corresponds to an electrostatic discharge (ESD) event of the electronic component.

3. The method of claim 1, wherein the equivalent circuit model comprises:
   a resistor, electrically coupled between the first terminal and the first node; and
   a capacitor, electrically coupled between the first node and a second terminal of the equivalent circuit model.

4. The method of claim 1, wherein the equivalent circuit model comprises a capacitor electrically coupled between the second node and a second terminal of the equivalent circuit model, and the first voltage controlled switch is electrically coupled between the first terminal and the second node.

5. The method of claim 1, wherein in response to the test charge, the voltage level of the first terminal proceeds to be pulled up from the holding voltage level to make a voltage level of a third node of the equivalent circuit model be pulled up, and the method further comprises:
   in response to the voltage level of the third node reaching a third threshold, turning on a third voltage controlled switch of the equivalent circuit model to make the voltage level of the second node be lower than the second threshold, in order to turn off the second voltage controlled switch.

6. The method of claim 5, wherein the equivalent circuit model comprises:
   a resistor, electrically coupled between the first terminal and the third node;
   a capacitor, electrically coupled between the third node and a second terminal of the equivalent circuit model;
   wherein the third voltage controlled switch is electrically coupled between the second node and the second terminal.

7. The method of claim 1, further comprising:
   in response to a period of the first terminal receiving the test charges reaching a time threshold, turning on a fourth switch of the equivalent circuit model to make the voltage level of the second node be lower than the second threshold, in order to turn off the second voltage controlled switch.

8. The method of claim 7, wherein the fourth switch is electrically coupled between the second node and a second terminal of the equivalent circuit model.

9. An apparatus for simulating breakdown of an electronic component, comprising:
   a storage device, configured to store a description file of an equivalent circuit model of the electronic component; and
   a processing circuit, electrically coupled to the storage device, configured to execute a simulation of the equivalent circuit model according to the description file, in order to obtain a response of the equivalent circuit model regarding test charges, wherein the equivalent circuit model comprises:
   a first terminal, configured to receive the test charges to increase a voltage level of a first node of the equivalent circuit model;
   a first voltage controlled switch, electrically coupled to the first node, wherein when the voltage level of the first node reaches a first threshold, the first voltage controlled switch is turned on to increase a voltage level of a second node of the equivalent circuit model; and
   a second voltage controlled switch, electrically coupled to the second node, wherein when the voltage level of the second node reaches a second threshold, the second voltage controlled switch is turned on to decrease a voltage level of the first terminal to a holding voltage level, in order to simulate a snapback breakdown of the electronic component;
   wherein the equivalent circuit model comprises:
   a holding voltage source, electrically coupled between the second voltage controlled switch and a second terminal of the equivalent circuit model;
   wherein the second voltage controlled switch is electrically coupled between the first terminal and the holding voltage source.

10. The apparatus of claim 9, wherein the first voltage controlled switch being turned on corresponds to an electrostatic discharge (ESD) event of the electronic component.

11. The apparatus of claim 9, wherein the equivalent circuit model comprises:
    a resistor, electrically coupled between the first terminal and the first node; and
    a capacitor, electrically coupled between the first node and a second terminal of the equivalent circuit model.

12. The apparatus of claim 9, wherein the equivalent circuit model comprises:
    a capacitor, electrically coupled between the second node and a second terminal of the equivalent circuit model;
    wherein the first voltage controlled switch is electrically coupled between the first terminal and the second node.

13. The apparatus of claim 9, wherein in response to the test charge, the voltage level of the first terminal proceeds to be pulled up from the holding voltage level to make a voltage level of a third node of the equivalent circuit model be pulled up, and when the voltage level of the third node reaches a third threshold, a third voltage controlled switch of the equivalent circuit model is turned on to make the voltage level of the second node be lower than the second threshold, in order to turn off the second voltage controlled switch.

14. The apparatus of claim 13, wherein the equivalent circuit model comprises:
   a resistor, electrically coupled between the first terminal and the third node;
   a capacitor, electrically coupled between the third node and a second terminal of the equivalent circuit model;
   wherein the third voltage controlled switch is electrically coupled between the second node and the second terminal.

15. The apparatus of claim 9, wherein the equivalent circuit model further comprises:
   a fourth switch, wherein when a period of the first terminal receiving the test charges reaches a time threshold, the fourth switch is turned on to make the voltage level of the second node be lower than the second threshold, in order to turn off the second voltage controlled switch.

16. The apparatus of claim 15, wherein the fourth switch is electrically coupled between the second node and a second terminal of the equivalent circuit model.

* * * * *